United States Patent
Song et al.

(10) Patent No.: US 9,774,642 B2
(45) Date of Patent: Sep. 26, 2017

(54) METHOD AND DEVICE FOR PUSHING MULTIMEDIA RESOURCE AND DISPLAY TERMINAL

(71) Applicants: Hisense Co., Ltd, Qingdao, Shandong (CN); HISENSE USA CORPORATION, Suwanee, GA (US)

(72) Inventors: Hu Song, Qingdao (CN); Tongqing Gao, Qingdao (CN); Zhiqiang Li, Qingdao (CN); Tingfeng Guo, Qingdao (CN); Yichen Ding, Qingdao (CN)

(73) Assignees: HISENSE CO., LTD., Shandong (CN); HISENSE USA CORPORATION, Suwanee, GA (US)

( * ) Notice: Subject to any disclaimer, the term of this patent is extended or adjusted under 35 U.S.C. 154(b) by 276 days.

(21) Appl. No.: 14/341,607

(22) Filed: Jul. 25, 2014

(65) Prior Publication Data
US 2015/0312296 A1    Oct. 29, 2015

(30) Foreign Application Priority Data
Apr. 24, 2014   (CN) .......................... 2014 1 0168232

(51) Int. Cl.
| | |
|---|---|
| *G06F 15/16* | (2006.01) |
| *H04L 29/06* | (2006.01) |
| *H04L 12/927* | (2013.01) |
| *H04L 29/08* | (2006.01) |
| *H04L 12/841* | (2013.01) |

(52) U.S. Cl.
CPC .......... *H04L 65/4061* (2013.01); *H04L 47/80* (2013.01); *H04L 65/1069* (2013.01); *H04L 67/26* (2013.01); *H04L 47/28* (2013.01)

(58) Field of Classification Search
CPC . H04L 65/4061; H04L 65/1069; H04L 67/26; H04L 47/80; H04L 47/28; H04L 67/10
USPC ........................................................ 709/203
See application file for complete search history.

(56) References Cited

U.S. PATENT DOCUMENTS

| | | | | |
|---|---|---|---|---|
| 7,631,336 | B2 * | 12/2009 | Diaz Perez ............ | G06Q 30/02 725/109 |
| 8,856,355 | B2 * | 10/2014 | Queen ................... | H04L 12/282 345/2.1 |
| 2007/0294726 | A1 | 12/2007 | Drazin | |
| 2010/0081475 | A1 | 4/2010 | Chiang et al. | |
| 2010/0095240 | A1 | 4/2010 | Shiplacoff et al. | |
| 2013/0047178 | A1 | 2/2013 | Moon et al. | |

(Continued)

OTHER PUBLICATIONS

EP 14189473.3-1954, European Search Report dated Feb. 9, 2015, 7 pages.

*Primary Examiner* — Joseph Greene
(74) *Attorney, Agent, or Firm* — Knobbe Martens Olson & Bear LLP

(57) ABSTRACT

A method and device for pushing a multimedia resource and a display terminal, the method including: obtaining, by a cloud server, a device identifier of a mobile terminal upon determining that the mobile terminal has established a connection with a display terminal; searching with the device identifier a device identifier information table for multimedia resource play information corresponding to the device identifier; determining multimedia resources to be played according to the multimedia resource play information; and transmitting the multimedia resources to be played to the display terminal.

16 Claims, 7 Drawing Sheets

(56) References Cited

U.S. PATENT DOCUMENTS

2014/0344334 A1* 11/2014 Trachtenberg ..... H04N 21/4307
709/203
2015/0046557 A1  2/2015 Rosenberg
2015/0262067 A1* 9/2015 Sridhara ................. G06N 5/04
706/12
2015/0289005 A1* 10/2015 Holmquist ....... H04N 21/42684
725/25

* cited by examiner

METHOD AND DEVICE FOR PUSHING MULTIMEDIA RESOURCE AND DISPLAY TERMINAL

CROSS-REFERENCES TO RELATED APPLICATIONS

This application claims priority to Chinese Patent Application No. 201410168232.8, filed with the Chinese Patent Office on Apr. 24, 2014, and entitled "Method and Device for pushing multimedia resource", the content of which is hereby incorporated by reference in its entirety.

FIELD

The present disclosure generally relates to the field of communications and particularly to a method and device for pushing a multimedia resource and a display terminal.

BACKGROUND

At present there are various multimedia resources flooding the Internet, and a user may browse or watch these multimedia resources on a TV set, a computer or other display terminals; and moreover the user may also browse or watch these multimedia resources on a handset, a computer or other mobile terminals.

A mobile terminal and a display terminal located in a same local area network may share some multimedia resource. For example, the mobile terminal may transmit some contents to the display terminal for display or play, and the display terminal may also transmit some contents to the mobile terminal for operation or storage. Of course the mobile terminal and the display terminal may also transmit other information, e.g., a request message, an acknowledgement message, etc., between them.

SUMMARY

An embodiment of the disclosure provides a method for pushing a multimedia resource, the method including:
obtaining, by a cloud server, a device identifier of a mobile terminal upon determining that the mobile terminal has established a connection with a display terminal;
searching, by the cloud server, with the device identifier a device identifier information table for multimedia resource play information corresponding to the device identifier;
determining, by the cloud server, multimedia resources to be played according to the multimedia resource play information; and
transmitting, by the cloud server, the multimedia resources to be played to the display terminal.

An embodiment of the disclosure provides a method for pushing a multimedia resource, the method including:
obtaining, by a display terminal, a device identifier of a mobile terminal upon determining that a connection has been established with the mobile terminal;
transmitting the device identifier to a cloud server so that the cloud server searches with the device identifier a device identifier information table for multimedia resource play information corresponding to the device identifier and determines multimedia resources to be played according to the multimedia resource play information and then transmits the multimedia resources to be played to the display terminal; and
receiving the multimedia resources to be played.

An embodiment of the disclosure provides a device for pushing a multimedia resource, including:
a memory; and
one or more processors,
wherein the memory has computer readable program codes stored therein, and the one or more processors are configured to execute the computer readable program codes to perform:
obtaining a device identifier of a mobile terminal upon determining that the mobile terminal has established a connection with a display terminal;
searching with the device identifier a device identifier information table for multimedia resource play information corresponding to the device identifier;
determining multimedia resources to be played according to the multimedia resource play information; and
transmitting the multimedia resources to be played to the display terminal.

An embodiment of the disclosure provides a display terminal, including:
a memory; and
one or more processors,
wherein the memory has computer readable program codes stored therein, and the one or more processors are configured to execute the computer readable program codes to perform:
obtaining a device identifier of a mobile terminal upon determining that a connection has been established with the mobile terminal;
transmitting the device identifier to a cloud server so that the cloud server searches with the device identifier a device identifier information table for multimedia resource play information corresponding to the device identifier and determines multimedia resources to be played according to the multimedia resource play information and then transmits the multimedia resources to be played to the display terminal; and
receiving the multimedia resources to be played.

DETAILED DESCRIPTION OF CERTAIN EMBODIMENTS

Some embodiments of the disclosure provide a method for pushing a multimedia resource, and some embodiments of the disclosure will be described below with reference to the drawings.

A mobile terminal, as referred to in the embodiments of the disclosure, may include a smartphone, a smart tablet PC and other numerous electronic devices, and a display terminal may include a smart TV set or another player.

Each mobile terminal is provided with an identifier by which the mobile terminal may be identified uniquely, e.g., an International Mobile Equipment Identity (IMEI) or another type of identifier; and each display terminal (e.g., a smart TV set) is also provided with an identifier which uniquely identifies the display terminal, e.g., a device ID of the display terminal, and optionally in some embodiments, the device identifier of the mobile terminal may be an IMEI, and the device number of the display terminal may be a device ID. In embodiments of the disclosure, the device identifier is configured to uniquely identify the mobile terminal; and the device number of the display terminal is configured to uniquely identify the display terminal.

Figure 1:
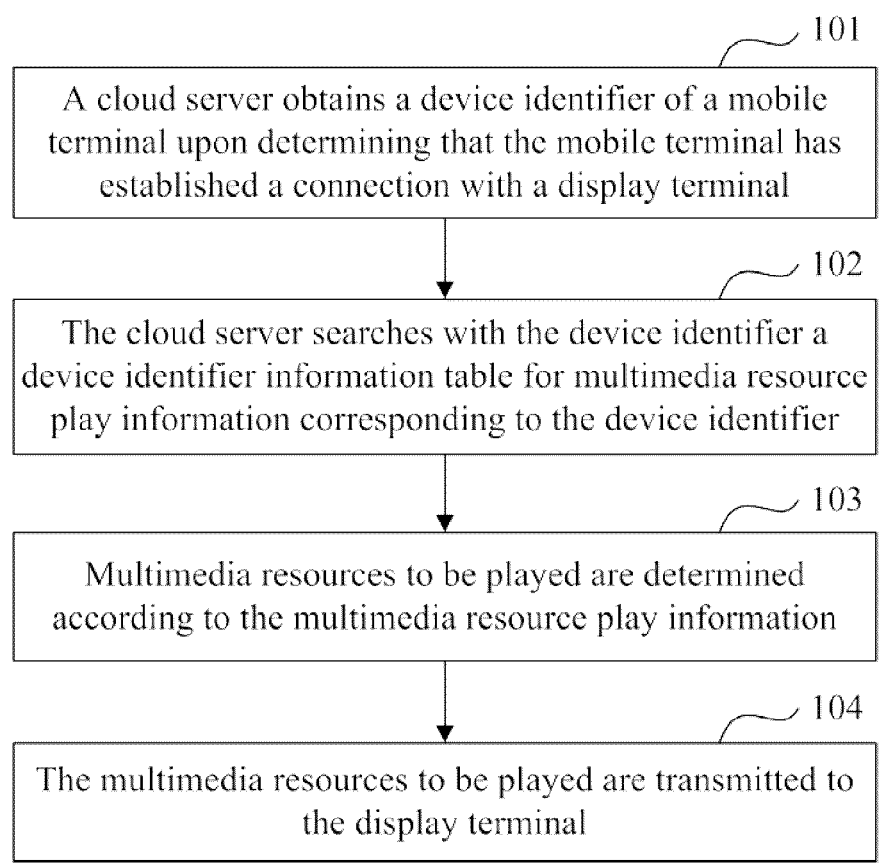
FIG. 1 is a flow chart of a method for pushing a multimedia resource according to an embodiment of the disclosure.

Referring to FIG. 1, a method for pushing a multimedia resource according to an embodiment of the disclosure includes:

Step 101: A cloud server obtains a device identifier of a mobile terminal upon determining that the mobile terminal has established a connection with a display terminal.

Where the cloud server determines that the mobile terminal has established a connection with the display terminal as follows:

The cloud server receives a sync authentication request message transmitted from the display terminal, where the sync authentication request message carries the device identifier of the mobile terminal and a device number of the display terminal; wherein the device identifier is configured to uniquely identify the mobile terminal; and the device number of the display terminal is configured to uniquely identify the display terminal.

The cloud server authenticates the mobile terminal according to the device identifier in the sync authentication request message, registers an association relationship between the mobile terminal and the display terminal according to the device identifier and the device number and returns an authentication status message to the display terminal so that the display terminal transmits a connection acknowledgement message respectively to the mobile terminal and the cloud server, and the cloud server determines that the mobile terminal has established a connection with the display terminal upon reception of the connection acknowledgement message.

The cloud server may obtain the device identifier of the mobile terminal from the sync authentication request message or the received connection acknowledgment message upon determining that the mobile terminal has established a connection with the display terminal.

Step 102: The cloud server searches with the device identifier a device identifier information table for multimedia resource play information corresponding to the device identifier.

In an embodiment, multimedia resource play information corresponding to device identifiers (e.g., IMEIs) of different mobile terminals, such as recent play records, aggregate records of multimedia resources played in a preset period of time, etc., is stored in the device identifier information table (e.g., an IMEI Map) of the cloud server. When a user of the mobile terminal plays the multimedia resource on the display terminal, the cloud server collects a behavior of the user of the mobile terminal and store it into the IME Map. In some embodiments, the multimedia resource may be played according to the multimedia resource play information in the IMEI Map next time the user of the mobile terminal plays it on the display terminal.

After the IMEI of the current terminal is determined, the IMEI Map in the cloud server is searched for the IMEI to thereby obtain the multimedia resource play information corresponding to the IMEI.

Step 103: Multimedia resources to be played are determined according to the multimedia resource play information.

In an embodiment, the step 103 may be performed in the following steps:

Obtaining a set of current popular multimedia resources as the multimedia resources to be played upon judging that the multimedia resource play information is null; and Obtaining the multimedia resources to be played according to the multimedia resource play information upon judging that the multimedia resource play information is not null.

When the mobile terminal pushes the multimedia resource through the cloud server for the first time, the IMEI corresponding to the mobile terminal and the corresponding multimedia resource play information has not been stored in the cloud server, so the set of current popular multimedia resources may be taken as the multimedia resources to be played, where the set of current popular multimedia resources may be preset or may be selected and determined by the cloud server according to all the stored multimedia resource play information.

When the mobile terminal pushes the multimedia resource through the cloud server for the non-first time, the IMEI corresponding to the mobile terminal and the corresponding multimedia resource play information has been stored in the cloud server, and the cloud server recommends multimedia resources according to the multimedia resource play information to obtain a set of multimedia contents satisfying an interest characteristic of the user of the current mobile terminal, and takes the set of multimedia contents as the multimedia resources to be played.

Step 104: The multimedia resources to be played are transmitted to the display terminal.

In some embodiments of the disclosure, before a multimedia resource is pushed each time, firstly the mobile terminal may establish a connection with the display terminal, and the cloud server further push the multimedia resource to the display terminal upon determining the mobile terminal establishing a connection with the display terminal. That is, the cloud server may push only a multimedia resource related to the mobile terminal to the display terminal.

In an embodiment, the step 104 is performed in the following steps:

Determining a play type of the display terminal according to the device number of the display terminal;

Selecting, from the multimedia resources to be played, a multimedia resource satisfying the play type as a target multimedia resource according to the play type of the display terminal; and Transmitting the target multimedia resource to the display terminal.

In an embodiment, after the play type of the display terminal is determined and before the multimedia resource satisfying the play type is selected from the multimedia resources to be played as the target multimedia resource, the method further includes:

Adjusting play formats and/or play information contents of the multimedia resources to be played according to the play type of the display terminal, where the play formats of the multimedia resources to be played are adjusted, for example, a multimedia resource to be played in a play format of AVI is adjusted to a multimedia resource to be played in a play format of MOV according to the play type of the display terminal, and the play information contents of the multimedia resources to be played are adjusted, that is, formats of description information of the multimedia resources to be played are adjusted, for example, XML contents describing a multimedia resource to be played are assembled to ensure that the multimedia resource to be played may be played normally on the display terminal.

Figure 2:
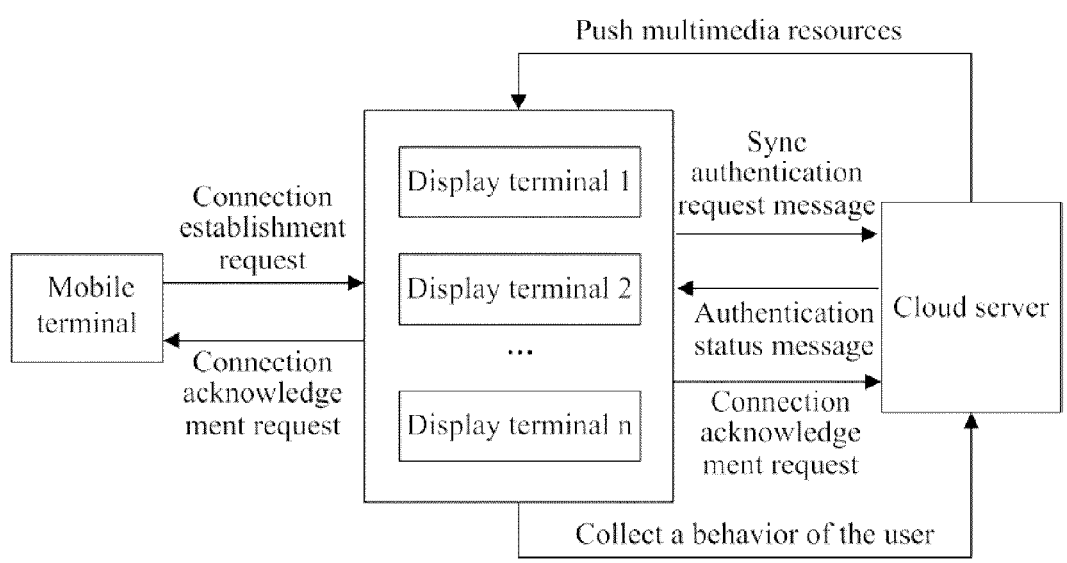
FIG. 2 is a schematic structural diagram of a system for pushing a multimedia resource according to an embodiment of the disclosure.

Based upon the foregoing embodiment, referring to FIG. 2, an embodiment of the disclosure further provides a system for pushing a multimedia resource. A mobile terminal obtains a list of display terminals (e.g., smart TV sets), with which a connection may be established in a network, after accessing the network; the mobile terminal selects a target display terminal from the list of display terminals and transmits the connection establishment request to the target display terminal; the target display terminal transmits a sync authentication request message to a cloud server upon reception of the connection establishment request; the cloud server authenticates the mobile terminal and registers temporarily an association relationship between the mobile terminal and the target display terminal according to the device identifier of the mobile terminal and finally returns an authentication status message to the target display terminal; and the target display terminal determines that the association relationship between the mobile terminal and the target display terminal has been registered and transmits a connection acknowledgement message respectively to the mobile terminal and the cloud server upon reception of the authentication status message, so that the flow of establishing a connection between the mobile terminal and the target display terminal has been finished. The cloud server pushes the multimedia resources to be played to the target display terminal upon determining the multimedia resources to be played; and when a user of the mobile terminal plays a multimedia resource on the target display terminal, the cloud server will collect a behavior of the user of the mobile terminal and store it into a device identifier information table.

Figure 3:
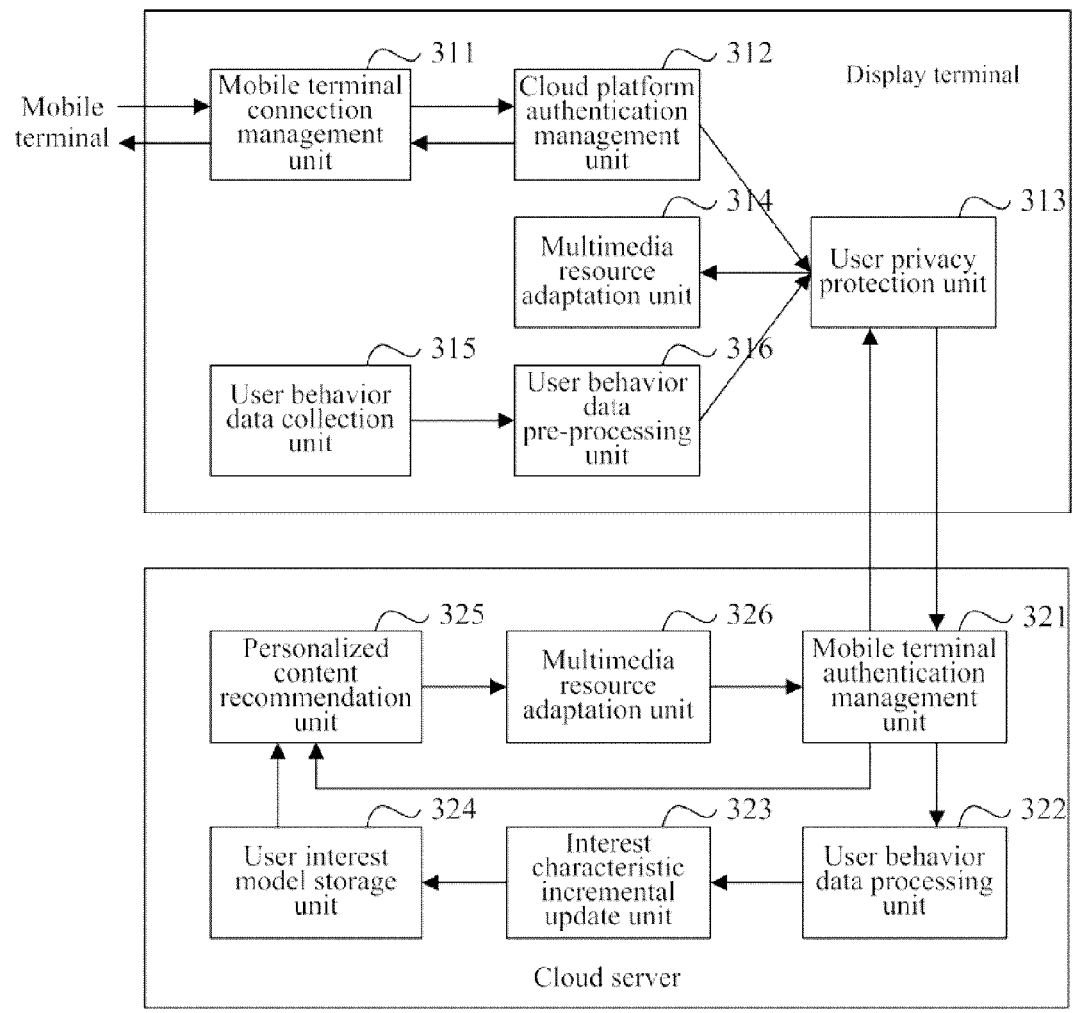
FIG. 3 is a schematic structural diagram of a service framework for pushing a multimedia resource according to an embodiment of the disclosure.

Referring to FIG. 3, an embodiment of the disclosure provides a framework architecture for pushing a multimedia resource, where after a mobile terminal transmits a connection establishment request to the display terminal, a mobile terminal connection management unit 311 in a display terminal receives the connection establishment request; the mobile terminal connection management unit 311 transmits IMEI information of the mobile terminal to a cloud platform authentication management unit 312, and further a user privacy protection unit 313 transmits a sync authentication request message carrying the IMEI information of the mobile terminal to a mobile terminal authentication management unit 321 in the cloud server; and the mobile terminal authentication management unit 321 determines that multimedia resource play information of the mobile terminal is found in an IMEI Map, a personalized content recommendation unit 325 may obtain multimedia resources to be played satisfying a user interest characteristic according to the found multimedia resource play information, and a multimedia resource adaptation unit 326 adjusts play formats and/or play information contents of the obtained multimedia resources to be played and adapts them to the display terminal, and then the mobile terminal authentication management unit 321 pushes the adapted multimedia resources to the user privacy protection unit 313 of the display terminal, and the user privacy protection unit 313 adjusts adaptively through a multimedia resource adaptation unit 314 and plays the adapted multimedia resources. When the mobile terminal authentication management unit 321 determines that no multimedia resource play information of the mobile terminal is found in the IMEI Map, then the personalized content recommendation unit 325 takes a set of current popular multimedia resources directly as the multimedia resources to be played, and the multimedia resource adaptation unit 326 adjusts and adapts play formats and/or play information contents thereof and then transmits them to the display terminal for play. In an embodiment, the display terminal may further include a user behavior data collection unit 315 configured to collect behavior data of a user after the user selects a multimedia resource, a user behavior data preprocessing unit 316 processes and then transmits, through the user privacy protection unit 313, the collected data to the cloud server, the mobile terminal authentication management unit 321 transmits the collected user behavior data to a user behavior data processing unit 322, the user behavior data processing unit 322 preprocesses the collected user behavior data (e.g., the name of a multimedia resource opened by the user and a series of behavior data including Forward, Backward, Close, etc.), an interest characteristic incremental update unit 323 extracts an interest characteristic in the user behavior data, and a user interest model storage unit 324 updates a new interest model of the user behavior with the extracted interest characteristic in the user behavior data and stores the new interest model in the IMEI Map.

Figure 4:
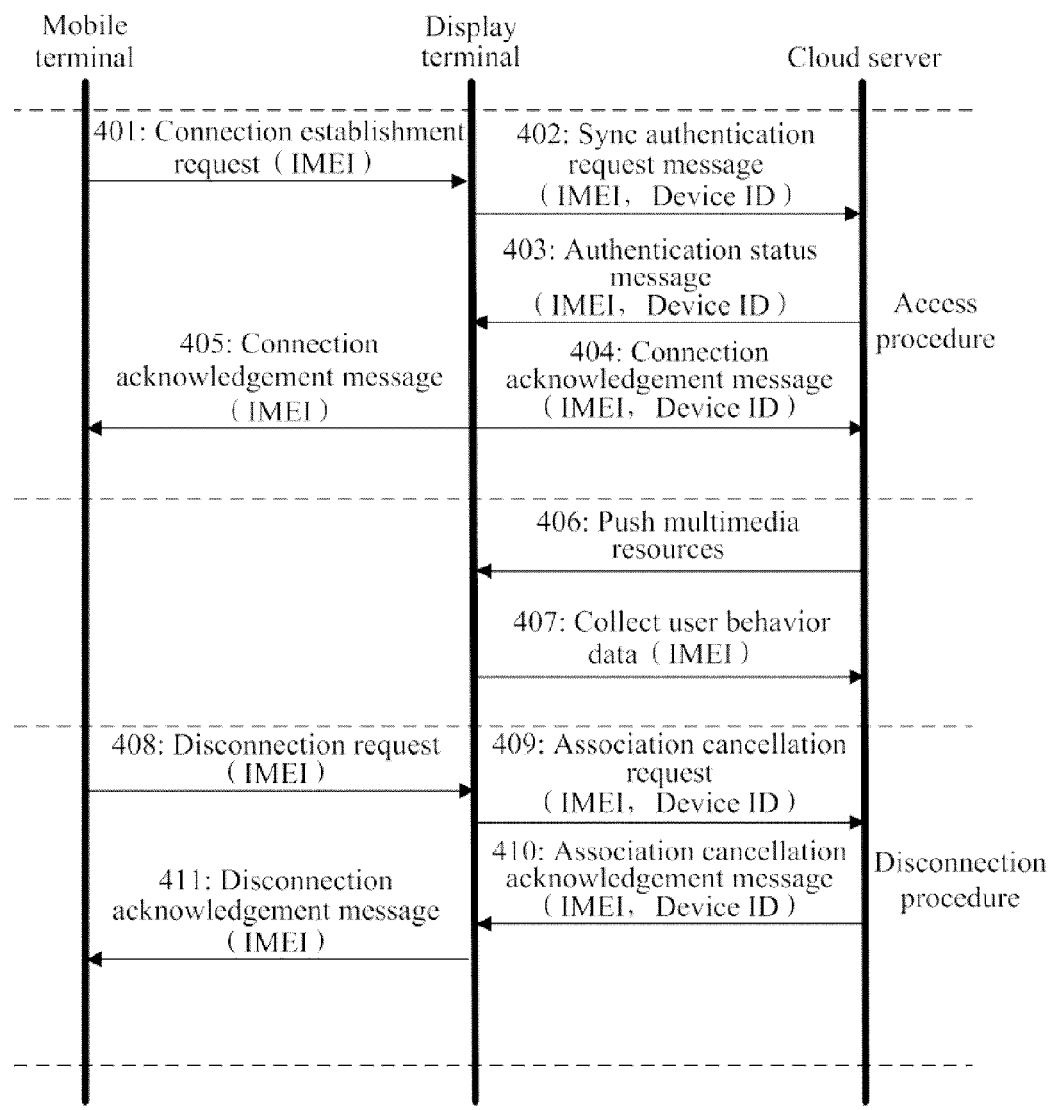
FIG. 4 is a flow chart of a method for pushing a multimedia resource according to an embodiment of the disclosure.

Referring to FIG. 4, some embodiments provide a method for pushing a multimedia resource, and a general flow thereof includes:

Step 401: A mobile terminal transmits a connection establishment request carrying its own IMEI to a display terminal.

Step 402: The display terminal transmits a sync authentication request message to cloud server upon reception of the connection establishment request, where the sync authentication request message carries the IMEI of the mobile terminal and the device ID of the display terminal.

Step 403: The cloud server registers an association relationship between the mobile terminal and the display terminal according to the IMEI and the device ID carried in the sync authentication request message and returns an authentication status message to the display terminal.

Step 404: The display terminal transmits a connection acknowledgement message to the cloud server.

Step 405: The display terminal transmits a connection acknowledgment message to the mobile terminal.

Step 406: The cloud server determines multimedia resources to be played according to the IMEI of the mobile terminal and pushes the determined multimedia resources to be played to the display terminal.

Moreover in some embodiments, after the multimedia resources to be played are pushed to the display terminal, the display terminal may further collect operation information on these multimedia resources and may further transmit the operation information to the cloud server, for example, as illustrated in the step 407.

Step 407: After a user selects and plays some multimedia resource among the multimedia resources to be played, the display terminal collects corresponding information of key-pressing and other actions operating on these multimedia resources, i.e., user behavior data, and transmits the information into an IMEI Map in the cloud server.

Additionally in some embodiments, the method may further include a process of terminating of the multimedia resource pushing, and for details of a flow thereof, reference may be made to the step 408 to the step 411.

Step 408: The user transmits a disconnection request through the mobile terminal, where the disconnection request carries the IMEI of the mobile terminal.

Step 409: The display terminal transmits an association cancellation request carrying the IMEI and the device ID to the cloud server upon reception of the disconnection request.

Step 410: The cloud server transmits an association cancellation acknowledge message to the display terminal after cancelling the association relationship between the mobile terminal and the display terminal.

Step 411: The display terminal transmits a disconnection acknowledgement message to the mobile terminal upon reception of the association cancellation acknowledge message.

In an embodiment, the mobile terminal may be a smartphone, and the display terminal may be a smart TV set. Still referring to FIG. 3, the smartphone and the smart TV set establish a connection and push a multimedia resource according to the Universal Plug and Play (UPNP) protocol in the following process after both of them access the same WIFI local area network.

The smartphone transmits the connection establishment request on its own initiative to the selected smart TV set in response to an instruction of the user, where the connection establishment request includes the IMEI of the smartphone, e.g., "356845058713361";

Upon reception of the connection establishment request transmitted from the smartphone, the mobile terminal connection management unit 311 in the smart TV set has the IMEI of the smartphone (i.e., "356845058713361") or the device ID of the smart TV set (e.g., "1KBA430393") subjected to authentication management at the cloud platform authentication management unit 312 and transmits the sync authentication request message to the cloud server through the user privacy protection until 313.

In the cloud server, the mobile terminal authentication management unit 321 receives the sync authentication request message transmitted from the smart TV set, parses the sync authentication request message for the IMEI of the smart TV set and searches the IMEI Map for information related to the IMEI; and also the mobile terminal authentication management unit 321 transmits the authentication status message to the smart TV set to thereby finish the entire connection request process.

The personalized content recommendation unit 325 receives authentication result information RESULT from the mobile terminal authentication management unit 321, and if the RESULT information is FALSE, that is, the IMEI is recorded in the IMEI Map for the first time, then the personalized content recommendation unit 325 generates the set of current popular multimedia resources; and if the RESULT information is TURE, that is, interest information related to the IMEI (i.e., the multimedia resource play information) has been stored in the IMEI Map, then the personalized content recommendation unit 325 generates multimedia resources to be played of interest to the IMEI using a personalized recommendation algorithm;

The multimedia resource adaptation unit 326 determines the type of the authenticated smart TV set, and types of multimedia formats, for which normal playing is supported by the smart TV set, according to the device ID of the smart TV set and assembles the received multimedia resources to be played from the personalized content recommendation unit 325 into recommended multimedia resources adapted to the smart TV set (that is, target multimedia resources), where the recommended multimedia resources are described in a structured representation of XML;

The mobile terminal authentication management unit 321 transmits the assembled recommended multimedia resources adapted to the smart TV set to the smart TV set according to a result of temporary registration; and The user privacy protection unit 313 of the smart TV set parses and transmits the received recommended multimedia resources to the multimedia resource adaptation unit 314, and the multimedia resource adaptation unit 314 parses the recommended multimedia resources represented in the XML and presents them among interface contents of the smart TV set.

The smartphone collects the user behavior data in the followings process after establishing a connection with the smart TV set:

The user behavior data collection unit 315 in the smart TV set collects in real time raw behavior data of the current watcher of the multimedia resources and transmits such collected complex raw behavior data to the user behavior data pre-processing unit 316;

The user behavior data pre-processing unit 316 parses the collected raw user behavior data, adjusts it in data format into simplified behavior report data, and the user privacy protection unit 313 transmits the simplified behavior report data including the device ID of the smart TV set; and The mobile terminal authentication management unit 321 in the cloud server transmits the behavior report data to the user behavior data processing unit 322 upon reception thereof, and the user behavior data processing unit 322 mines for operation information and an interest characteristic of the current watcher according to the behavior report data, performs an interest model incremental update process of the current user through the interest characteristic incremental update unit 323 and finally transmits the data processed by the interest characteristic incremental update unit 323 (i.e., a new user interest model) to the user interest model storage unit 324 for storage and update. The updated user interest model will be put into use when the current watcher requests again personalized multimedia resources to be recommended to thereby ensure that the updated user interest model may reflect a real demand of the current watcher accurately in time.

Figure 5:
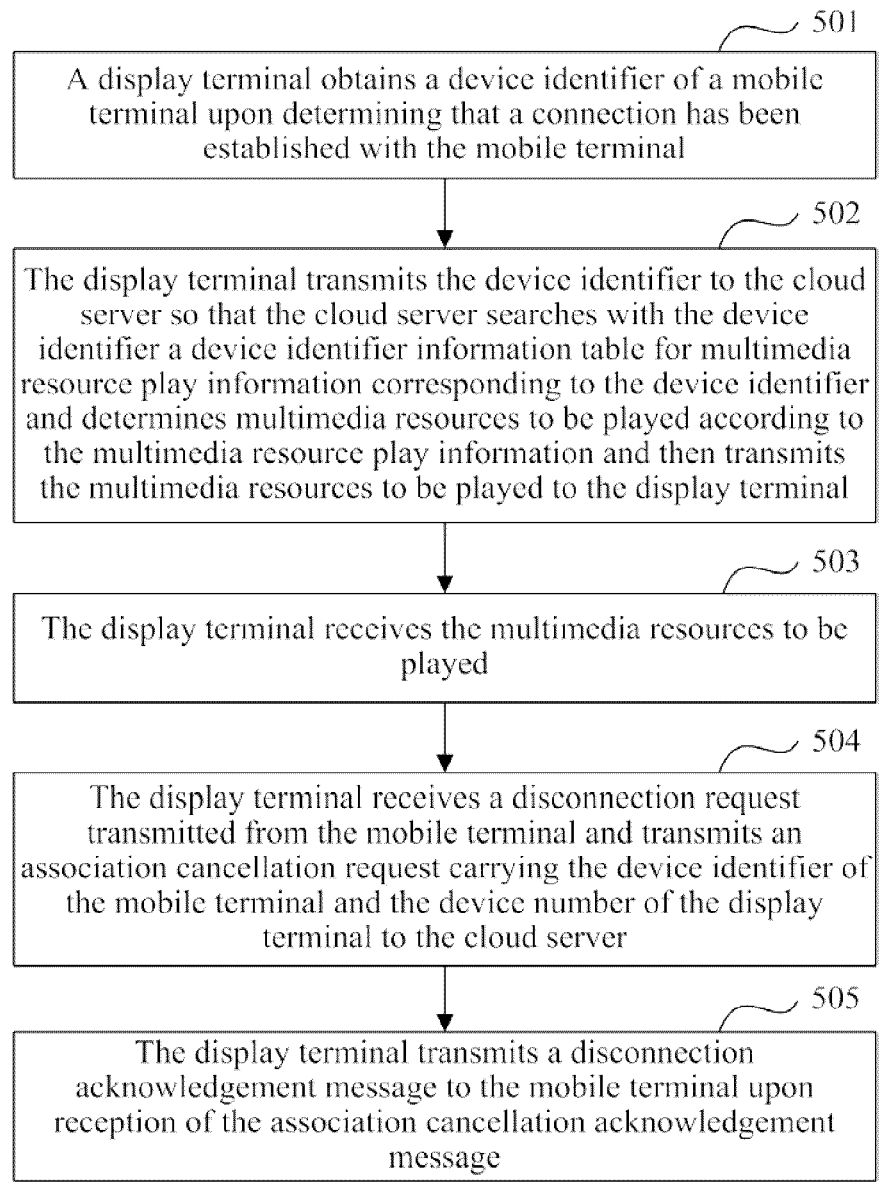
FIG. 5 is a flow chart of a method for pushing a multimedia resource according to some embodiments of the disclosure.

Based upon the foregoing embodiment, referring to FIG. 5, some embodiments of the disclosure further provide a method for pushing a multimedia resource, and a particular flow thereof is as follows:

Step 501: A display terminal obtains a device identifier of a mobile terminal upon determining that a connection has been established with the mobile terminal.

In an embodiment, the display terminal determines that a connection has been established with the mobile terminal as follows:

The display terminal transmits a sync authentication request message to a cloud server upon reception of a connection establishment request transmitted from the mobile terminal so that the cloud server authenticates the mobile terminal in response to the sync authentication request message and registers an association relationship between the mobile terminal and the display terminal and then returns an authentication status message to the display terminal, where the sync authentication request message carries the device identifier of the mobile terminal and a device number of the display terminal; and The display terminal receives an authentication status message and transmits a connection acknowledgement message respectively to the mobile terminal and the cloud server.

Step 502: The display terminal transmits the device identifier to the cloud server so that the cloud server searches with the device identifier a device identifier information table for multimedia resource play information corresponding to the device identifier and determines multimedia resources to be played according to the multimedia resource play information and then transmits the multimedia resources to be played to the display terminal.

Step 503: The display terminal receives the multimedia resources to be played.

In an embodiment, with the foregoing process, the cloud server may determine the mobile terminal associated with the display terminal and push the multimedia resources for the mobile terminal to the display terminal, so the display terminal may play only the multimedia resources of interest to the mobile terminal which has established a connection therewith.

When a user does not need to watch the multimedia resources, the method may further include the following steps in some embodiments:

Step 504: The display terminal receives a disconnection request transmitted from the mobile terminal and transmits an association cancellation request carrying the device identifier of the mobile terminal and the device number of the display terminal to the cloud server; and The cloud server cancels therein the association between the mobile terminal and the display terminal and returns an association cancellation acknowledgement message to the display terminal upon reception of the association cancellation request.

Step 505: The display terminal transmits a disconnection acknowledgement message to the mobile terminal upon reception of the association cancellation acknowledgement message.

After the forgoing steps are performed, the mobile terminal is disconnected from the display terminal. In some embodiments, when there is a need to push a multimedia resource next time, the display terminal still may perform the steps 501 to 503 and establish a connection with the mobile terminal, and the cloud server may push a multimedia resource, for the mobile terminal connected with the display terminal, to the display terminal.

Figure 6:
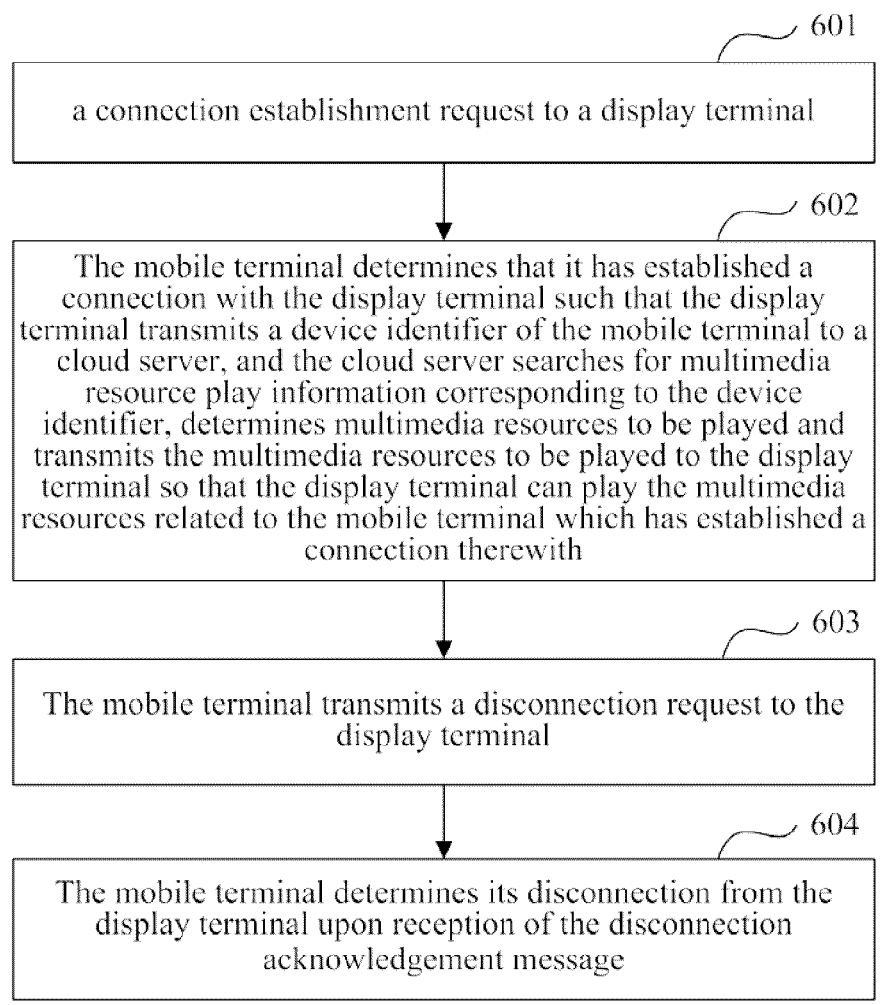
FIG. 6 is a flow chart of a method for pushing a multimedia resource according to some embodiments of the disclosure.

Based upon the foregoing embodiments, referring to FIG. 6, some embodiments of the disclosure provide a method for pushing a multimedia resource, and a particular flow thereof is as follows:

Step 601: A mobile terminal transmits a connection establishment request to a display terminal;

In an embodiment, the mobile terminal obtains a list of display terminals (e.g., smart TV sets), with which a connection may be established in a network, after accessing the network; and the mobile terminal selects a target display terminal from the list of display terminals and transmits the connection establishment request to the target display terminal.

Step 602: The mobile terminal determines that it has established a connection with the display terminal such that the display terminal obtains and transmits a device identifier of the mobile terminal to a cloud server, and the cloud server searches with the device identifier a device identifier table for multimedia resource play information corresponding to the device identifier, determines multimedia resources to be played according to the multimedia resource play information and transmits the multimedia resources to be played to the display terminal so that the display terminal may play the multimedia resources related to the mobile terminal which has established a connection therewith.

In an embodiment, the mobile terminal determines that the mobile terminal has established a connection with the display terminal as follows:

The mobile terminal transmits the connection establishment request to the display terminal such that the display terminal transmits a sync authentication request message to the cloud server upon reception of the connection establishment request, and the cloud server authenticates the mobile terminal in response to the sync authentication request message, registers an association relationship between the mobile terminal and the display terminal and returns an authentication status message to the display terminal so that the display terminal transmits a connection acknowledgement message respectively to the mobile terminal and the cloud server; and the mobile terminal determines that the mobile terminal has established a connection with the display terminal upon reception of the connection acknowledgement message.

With the step 601 and the step 602, the mobile terminal is thus associated with the display terminal, and the cloud server may push only the multimedia resources related to the mobile terminal to the display terminal. For particular operation flows of the cloud server and the display terminal, reference may be made to the flows of the methods in FIG. 1 to FIG. 5, and a repeated description thereof will be omitted here.

Moreover in some embodiments, after the steps 601 and 602 above are performed, the mobile terminal may further transmit a multimedia resource push alert message to the display terminal so that the display terminal obtains the device identifier of the mobile terminal according to the multimedia resource push alert message.

In some embodiments, when a user does not need to watch the multimedia resources, the method may further include:

Step 603: The mobile terminal transmits a disconnection request to the display terminal, where the disconnection request carries the device identifier of the mobile terminal; and The mobile terminal transmits the disconnection request so that the display terminal may transmit an association cancellation request to the cloud server upon reception of the disconnection request, and the cloud server cancels the association relationship between the mobile terminal and the display terminal and transmits an association cancellation acknowledgement message to the display terminal, and the display terminal transmits a disconnection acknowledgement message to the mobile terminal upon reception of the association cancellation acknowledgement message.

Step 604: The mobile terminal determines its disconnection from the display terminal upon reception of the disconnection acknowledgement message.

After the steps above are performed, the mobile terminal is disconnected from the display terminal. When there is a need to push a multimedia resource next time, the mobile terminal still may perform the steps 601 to 602 and establish a connection with the display terminal, so the cloud server may push a multimedia resource, for the mobile terminal connected with the display terminal, to the display terminal.

Figure 7:
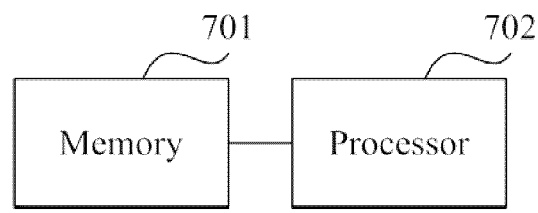
FIG. 7 is a schematic structural diagram of a device for pushing a multimedia resource according to some embodiments of the disclosure.

Based upon the foregoing embodiments, referring to FIG. 7, some embodiments of the disclosure further provide a device for pushing a multimedia resource, the device including a memory 701 and a processor 702, where:

One or more program codes are stored in the memory 701 and configured to be performed by the one or more processor 702. The one or more program codes include instructions for performing the method as illustrated in FIG. 1, and for details of the method, reference may be made to FIG. 1 and the relevant description thereof.

Figure 8:
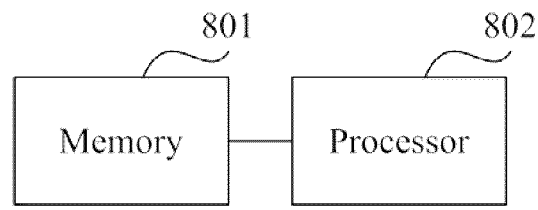
FIG. 8 is a schematic structural diagram of a display terminal according to an embodiment of the disclosure.

Based upon the foregoing embodiments, referring to FIG. 8, an embodiment of the disclosure provides a display terminal including a memory 801 and a processor 802, where:

One or more program codes are stored in the memory 801 and configured to be performed by the one or more processor 802. The one or more program codes include instructions for performing the method as illustrated in FIG. 5, and for details of the method, reference may be made to FIG. 5 and the relevant description thereof.

Figure 9:
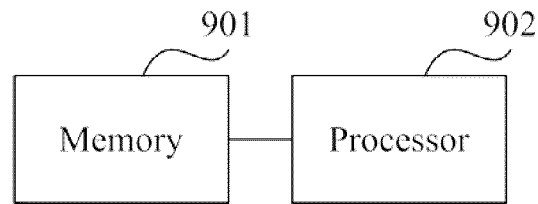
FIG. 9 is a schematic structural diagram of a mobile terminal according to an embodiment of the disclosure.

Additionally referring to FIG. 9, an embodiment of the disclosure provides a mobile terminal including a memory 901 and a processor 902, where:

One or more program codes are stored in the memory 901 and configured to be performed by the one or more processor 902. The one or more program codes include instructions for performing the method as illustrated in FIG. 6, and for details of the method, reference may be made to FIG. 6 and the relevant description thereof.

Moreover in some embodiments, the one or more program codes further include instructions for performing the following method: a mobile terminal transmits a multimedia resource push alert message to a display terminal so that the display terminal obtains a device identifier of the mobile terminal according to the multimedia resource push alert message.

On the other hand, still another embodiment of the disclosure further provides a computer readable storage medium which may be a computer readable storage medium included in the memories in the foregoing embodiments; or may be a separately existing computer readable storage medium which is not installed into the terminal. The computer readable storage medium stores therein one or more programs (in some embodiments, the computer readable storage medium may be one or more magnetic-disk storage devices, flash memory devices or other nonvolatile solid-state storage devices, CD-ROMs, optical memories, etc.), and the one or more programs may be executed by one or more processors to perform a method for pushing a multimedia resource. For steps included in the method, reference may be made to the relevant description of the embodiments illustrated in FIG. 1 to FIG. 6, and a repeated description thereof will be omitted here.

In summary, with a method for pushing a multimedia resource according to an embodiment of the disclosure, in the method, a cloud server obtains a device identifier of a mobile terminal upon determining that the mobile terminal has established a connection with a display terminal, searches with the device identifier a device identifier information table for multimedia resource play information corresponding to the device identifier, determines multimedia resources to be played according to the multimedia resource play information and finally transmits the multimedia resources to be played to the display terminal to thereby finish the process that the cloud server pushes for the mobile terminal a multimedia resource to the display terminal, and as such, multimedia resources are pushed according to the multimedia resource play information for the mobile terminal stored in the cloud server so that the pushed multimedia resources satisfy an interest of a watcher of a smart TV set (i.e., a user of the mobile terminal) to thereby improve the efficiency of pushing.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concepts can make additional modifications and variations to these embodiments. Therefore the appended claims are intended to be construed as encompassing certain embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for pushing a multimedia resource, comprising:
   obtaining, by a cloud server, a device identifier of a mobile terminal from a display terminal upon determining that the mobile terminal has established a direct connection with the display terminal, wherein the cloud server is directly connected with the display terminal, but not directly connected with the mobile terminal;
   searching, by the cloud server, with the device identifier a device identifier information table for multimedia resource play information corresponding to the device identifier;

determining, by the cloud server, multimedia resources, satisfying an interest characteristic of an user of the mobile terminal, to be played according to the multimedia resource play information; and transmitting, by the cloud server, the multimedia resources to be played to the display terminal, which is directly connected to the mobile terminal;

wherein determining, by the cloud server, that the mobile terminal has established a direct connection with the display terminal comprises:

receiving a sync authentication request message transmitted from the display terminal, wherein the sync authentication request message carries the device identifier of the mobile terminal and a device number of the display terminal; and authenticating the mobile terminal according to the device identifier in the sync authentication request message, registering an association relationship between the mobile terminal and the display terminal according to the device identifier and the device number and returning an authentication status message to the display terminal so that the display terminal sends a connection acknowledgement message respectively to the mobile terminal and the cloud server; and determining that the mobile terminal has established a connection with the display terminal upon reception of the connection acknowledgement message.

2. The method according to claim 1, wherein determining the multimedia resources to be played according to the multimedia resource play information comprises:

obtaining a set of current popular multimedia resources as the multimedia resources to be played upon judging that the multimedia resource play information is null; and obtaining the multimedia resources to be played according to the multimedia resource play information upon judging that the multimedia resource play information is not null.

3. The method according to claim 1, wherein transmitting the multimedia resources to be played to the display terminal comprises:

determining a play type of the display terminal according to the device number of the display terminal;

selecting, from the multimedia resources to be played, a multimedia resource satisfying the play type as a target multimedia resource according to the play type of the display terminal; and transmitting the target multimedia resource to the display terminal.

4. The method according to claim 3, wherein after the play type of the display terminal is determined and before the multimedia resource satisfying the play type is selected from the multimedia resources to be played as the target multimedia resource, the method further comprises:

adjusting play formats and/or play information contents of the multimedia resources to be played according to the play type of the display terminal.

5. The method according to claim 1, wherein the device identifier is configured to uniquely identify the mobile terminal.

6. The method according to claim 1, wherein the device number of the display terminal is configured to uniquely identify the display terminal.

7. A method for pushing a multimedia resource, comprising:

obtaining, by a display terminal, a device identifier of a mobile terminal upon determining that the display terminal has established a direct connection with the mobile terminal;

transmitting, by the display terminal, the device identifier to a cloud server so that the cloud server searches with the device identifier a device identifier information table for multimedia resource play information corresponding to the device identifier and determines multimedia resources, satisfying an interest characteristic of an user of the mobile terminal, to be played according to the multimedia resource play information and then transmits the multimedia resources to be played to the display terminal, wherein the cloud server is directly connected with the display terminal, but not directly connected with the mobile terminal; and receiving, by the display terminal which is directly connected to the mobile terminal, the multimedia resources to be played;

wherein determining, by the display terminal, that the display has been established a direct connection with the mobile terminal comprises:

transmitting a sync authentication request message to the cloud server upon reception of a connection establishment request transmitted from the mobile terminal so that the cloud server authenticates the mobile terminal in response to the sync authentication request message and registers an association relationship between the mobile terminal and the display terminal and then returns an authentication status message to the display terminal, wherein the sync authentication request message carries the device identifier of the mobile terminal and a device number of the display terminal; and receiving an authentication status message and transmitting a connection acknowledgement message respectively to the mobile terminal and the cloud server.

8. The method according to claim 7, wherein the device identifier is configured to uniquely identify the mobile terminal.

9. The method according to claim 7, wherein the device number of the display terminal is configured to uniquely identify the display terminal.

10. A server for pushing a multimedia resource, comprising:

a memory; and one or more processors, wherein the memory has computer readable program codes stored therein, and the one or more processors are configured to execute the computer readable program codes to perform:

obtaining a device identifier of a mobile terminal from a display terminal upon determining that the mobile terminal has established a direct connection with the display terminal;

searching with the device identifier a device identifier information table for multimedia resource play information corresponding to the device identifier;

determining multimedia resources, satisfying an interest characteristic of an user of the mobile terminal, to be played according to the multimedia resource play information; and transmitting the multimedia resources to be played to the display terminal;

wherein the server is directly connected with the display terminal, but not directly connected with the mobile terminal;

wherein determining that the mobile terminal has established a direct connection with the display terminal comprises:

receiving a sync authentication request message transmitted from the display terminal, wherein the sync authentication request message carries the device identifier of the mobile terminal and a device number of the display terminal; and authenticating the mobile terminal according to the device identifier in the sync authentication request message, registering an association relationship between the mobile terminal and the display terminal according to the device identifier and the device number and returning an authentication status message to the display terminal so that the display terminal sends a connection acknowledgement message respectively to the mobile terminal and the cloud server, and determining that the mobile terminal has established a connection with the display terminal upon reception of the connection acknowledgement message.

11. The device according to claim 10, wherein determining the multimedia resources to be played according to the multimedia resource play information comprises:

obtaining a set of current popular multimedia resources as the multimedia resources to be played upon judging that the multimedia resource play information is null; and obtaining the multimedia resources to be played according to the multimedia resource play information upon judging that the multimedia resource play information is not null.

12. The device according to claim 10, wherein transmitting the multimedia resources to be played to the display terminal comprises:

determining a play type of the display terminal according to the device number of the display terminal;

selecting, from the multimedia resources to be played, a multimedia resource satisfying the play type as a target multimedia resource according to the play type of the display terminal; and transmitting the target multimedia resource to the display terminal.

13. The device according to claim 12, wherein the one or more processors are further configured to execute the computer readable program codes to perform:

after the play type of the display terminal is determined and before the multimedia resource satisfying the play type is selected from the multimedia resources to be played as the target multimedia resource, adjusting play formats and/or play information contents of the multimedia resources to be played according to the play type of the display terminal.

14. The device according to claim 10, wherein the device identifier is configured to uniquely identify the mobile terminal.

15. The device according to claim 10, wherein the device number of the display terminal is configured to uniquely identify the display terminal.

16. A display terminal, comprising:

a memory; and one or more processors, wherein the memory has computer readable program codes stored therein, and the one or more processors are configured to execute the computer readable program codes to perform:

obtaining a device identifier of a mobile terminal upon determining that the display terminal has established a direct connection with the mobile terminal;

transmitting the device identifier to a cloud server so that the cloud server searches with the device identifier a device identifier information table for multimedia resource play information corresponding to the device identifier and determines multimedia resources, satisfying an interest characteristic of a user of the mobile terminal, to be played according to the multimedia resource play information and then transmits the multimedia resources to be played to the display terminal, wherein the cloud server is directly connected with the display terminal, but not directly connected with the mobile terminal; and receiving the multimedia resources to be played;

wherein determining that the display terminal has been established a direct connection with the mobile terminal comprises:

transmitting a sync authentication request message to the cloud server upon reception of a connection establishment request transmitted from the mobile terminal so that the cloud server authenticates the mobile terminal in response to the sync authentication request message and registers an association relationship between the mobile terminal and the display terminal and then returns an authentication status message to the display terminal, wherein the sync authentication request message carries the device identifier of the mobile terminal and a device number of the display terminal; and receiving an authentication status message and transmitting a connection acknowledgement message respectively to the mobile terminal and the cloud server.

* * * * *